United States Patent
Krishan

(10) Patent No.: US 10,313,883 B2
(45) Date of Patent: Jun. 4, 2019

(54) METHODS, SYSTEMS, AND COMPUTER READABLE MEDIA FOR USING AUTHENTICATION VALIDATION TIME PERIODS

(71) Applicant: Oracle International Corporation, Redwood Shores, CA (US)

(72) Inventor: Rajiv Krishan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/804,974

(22) Filed: Nov. 6, 2017

(65) Prior Publication Data

US 2019/0141527 A1    May 9, 2019

(51) Int. Cl.
*H04W 12/06* (2009.01)
*H04W 8/04* (2009.01)
*H04W 4/70* (2018.01)

(52) U.S. Cl.
CPC ............ *H04W 12/06* (2013.01); *H04W 4/70* (2018.02); *H04W 8/04* (2013.01)

(58) Field of Classification Search
CPC .... H04W 12/06; H04W 4/70; H04W 28/0215
See application file for complete search history.

(56) References Cited

U.S. PATENT DOCUMENTS

| | | | |
|---|---|---|---|
| 9,432,150 B2 | 8/2016 | Jain et al. | |
| 9,467,508 B2 | 10/2016 | Xu | |
| 9,621,450 B2 | 4/2017 | Jeong et al. | |
| 2012/0207113 A1 | 8/2012 | Yoon et al. | |
| 2013/0044596 A1 | 2/2013 | Zhi et al. | |
| 2013/0080782 A1* | 3/2013 | Rajadurai | H04L 63/065 713/171 |
| 2013/0272247 A1 | 10/2013 | Guo | |
| 2013/0336305 A1 | 12/2013 | Yan et al. | |
| 2014/0078968 A1 | 3/2014 | Korhonen et al. | |

(Continued)

FOREIGN PATENT DOCUMENTS

EP    3 018 946 A1    5/2016
WO    WO 2016/156549 A1    10/2016

(Continued)

OTHER PUBLICATIONS

3GPP TS 29.336, Universal Mobile Telecommunications System (UMTS); LTE;Home Subscriber Server (HSS) diameter interfaces for interworking with packet data networks and applications, Mar. 17, 2016, 3GPP TS 29.336 version 13.3.0 Release 13.*

(Continued)

*Primary Examiner* — Said M Elnoubi
(74) *Attorney, Agent, or Firm* — Jenkins, Wilson, Taylor & Hunt, P.A.

(57) ABSTRACT

A method includes receiving a first message associated with a first machine type communications (MTC) device; sending an authentication request associated with the first MTC device to a home subscriber server (HSS), wherein the authentication request requests a validated time period indicating an amount of time that authentication associated with the first MTC device is valid; and receiving, from the HSS, an authentication response, wherein the authentication response indicates the validated time period.

16 Claims, 6 Drawing Sheets

(56) References Cited

U.S. PATENT DOCUMENTS

| | | | |
|---|---|---|---|
| 2014/0086214 A1 | 3/2014 | Hong et al. | |
| 2014/0089442 A1 | 3/2014 | Kim et al. | |
| 2014/0334386 A1 | 11/2014 | Fukumasa et al. | |
| 2014/0376426 A1 | 12/2014 | Boudreau et al. | |
| 2014/0376454 A1 | 12/2014 | Boudreau et al. | |
| 2015/0036591 A1* | 2/2015 | Cao | H04W 4/12 370/328 |
| 2015/0055459 A1 | 2/2015 | Wong et al. | |
| 2015/0067328 A1* | 3/2015 | Yin | H04L 9/3236 713/168 |
| 2015/0111574 A1 | 4/2015 | Fukumasa et al. | |
| 2015/0319172 A1 | 11/2015 | Zhang et al. | |
| 2016/0007138 A1* | 1/2016 | Palanisamy | H04W 4/70 455/41.2 |
| 2016/0007170 A1 | 1/2016 | Vaidya et al. | |
| 2016/0085594 A1 | 3/2016 | Wang et al. | |
| 2016/0142860 A1* | 5/2016 | Kim | H04W 60/00 455/435.1 |
| 2016/0277243 A1 | 9/2016 | Kim et al. | |
| 2016/0337127 A1 | 11/2016 | Schultz et al. | |
| 2016/0337841 A1 | 11/2016 | Won et al. | |
| 2017/0295557 A1 | 10/2017 | Chamarty et al. | |
| 2017/0318570 A1 | 11/2017 | Shaw et al. | |
| 2018/0035351 A1 | 2/2018 | Kodaypak | |
| 2018/0092133 A1 | 3/2018 | Starsinic et al. | |
| 2018/0234291 A1 | 8/2018 | Mathison et al. | |
| 2018/0248711 A1 | 8/2018 | McCann | |
| 2018/0249281 A1 | 8/2018 | McCann | |
| 2018/0249282 A1 | 8/2018 | McCann | |

FOREIGN PATENT DOCUMENTS

| | | |
|---|---|---|
| WO | WO 2016/200357 A1 | 12/2016 |
| WO | WO 2017/017879 A1 | 2/2017 |
| WO | WO 2018/156318 A1 | 8/2018 |
| WO | WO 2018/156319 A1 | 8/2018 |
| WO | WO 2018/156320 A1 | 8/2018 |

OTHER PUBLICATIONS

"Universal Mobile Telecommunications System (UMTS); LTE; Diameter-based T4 Interface for communications with packet data networks and applications (3GPP TS 29.337 V14.2.0 Release 14)," ETSI TS 129 337 V14.2.0, pp. 1-25 (Oct. 2017).

Commonly-assigned, co-pending U.S. Appl. No. 15/649,627 for "Methods, Systems, and Computer Readable Media for Dynamically Provisioning Session Timeout Information in a Communications Network," (Unpublished, filed Jul. 13, 2017).

"Universal Mobile Telecommunications System (UMTS); LTE; Evolved Packet System (EPS); Mobility Management Entity (MME) and Serving GPRS Support Node (SGSN) related interfaces based on Diameter protocol (3GPP TS 29.272 V14.4.0 Release 14)," ETSI TS 129 272 V14.4.0, pp. 1-171 (Jul. 2017).

Commonly-assigned, co-pending U.S. Appl. No. 15/604,132 for "Methods, Systems and Computer Readable Media for Providing Integrated Service Capability Exposure Function (SCEF), Service Capability Server (SCS) and Application Server (AS) Services," (Unpublished, filed May 24, 2017).

"Universal Mobile Telecommunications System (UMTS); LTE; Home Subscriber Server (HSS) diameter interfaces for interworking with packet data networks and applications (3GPP TS 293.336 V14.1.0 Release 14)," ETSI TS 129 336 V14.1.0, pp. 1-66 (May 2017).

"Digital cellular telecommunications system (Phase 2+) (GSM); Universal Mobile Telecommunications System (UMTS); LTE; Circuit Switched (CS) fallback in Evolved Packet System (EPS); Stage 2 (3GPP TS 23.272 V14.0.0 Release 14)," ETSI TS 123 272 V14.0.0, pp. 1-105 (May 2017).

"LTE;General Packet Radio Service (GPRS) enhancements for Evolved Universal Terrestrial Radio Access Network (E-UTRAN) access (3GPP TS 23.401 V14.3.0 Release 14)," ETSI TS 123 401 V14.3.0, pp. 1-392 (May 2017).

Commonly-assigned, co-pending U.S. Appl. No. 15/499,847 for "Methods, Systems and Computer Readable Media for Providing Service Capability Exposure Function (SCEF) as a Diameter Routing Agent (DRA) Feature," (Unpublished, filed Apr. 27, 2017).

Commonly-assigned, co-pending U.S. Appl. No. 15/608,595 for "Methods, Systems and Computer Readable Media for Providing Service Capability Exposure Function (SCEF) as a Cloud Service," (Unpublished, filed May 30, 2017).

"Universal Mobile Telecommunications System (UMTS); LTE; Tsp interface protocol between the MTC Interworking Function (MTC-IWF) and Service Capability Server (SCS) (3GPP TS 29.368 V14.1.0 Release 14)," ETSI TS 129 368 V14.1.0, pp. 1-34 (Apr. 2017).

"3rd Generation Partnership Project; Technical Specification Group Services and System Aspects; Architecture enhancements to facilitate communications with packet data networks and applications (Release 15)," 3GPP TS 23.682 V15.0.0, pp. 1-109 (Mar. 2017).

"3rd Generation Partnership Project; Technical Specification Group Services and System Aspects; Architecture enhancements to facilitate communications with packet data networks and applications (Release 14)," 3GPP TS 23.682 V14.2.0, pp. 1-104 (Dec. 2016).

Abu-Lebdeh et al., "A Virtual Network PaaS for 3GPP 4G and Beyond Core Network Services," pp. 1-7 (Aug. 20, 2016).

"Universal Mobile Telecommunications System (UMTS); Mobility Management Entity (MME) and Serving GPRS Support Node (SGSN) interfaces for interworking with packet data and applications (3GPP TS 29.128 V13.0.0, Release 13)," ETSI TS 129.128 V13.0.0, pp. 1-40 (May 2016).

"3rd Generation Partnership Project; Technical Specification Group Services and System Aspects; Architecture enhancements to facilitate communications with packet data networks and applications (Release 13)," 3GPP TS 23.682 V13.5.0, pp. 1-90 (Mar. 2016).

"Digital cellular telecommunications system (Phase 2+) (GSM); Universal Mobile Telecommunications System (UMTS); LTE; Architecture enhancements to facilitate communications with packet data networks and applications (3GPP TS 23.682 V13.4.0 Release 13)," ETSI TS 123 682 V13.4.0, pp. 1-82 (Mar. 2016).

"Universal Mobile Telecommunications System (UMTS); LTE; Home Subscriber Server (HSS) diameter interfaces for interworking with packet data networks and applications (3GPP TS 29.336 V13.2.0 Release 13)," ETSI TS 129.336 V13.2.0, pp. 1-48 (Mar. 2016).

"Cloud Innovation Solution," ZTE Corporation, pp. 1-31 (2016).

Taleb et al., "EASE: EPC as a Service to Ease Mobile Core Network Deployment over Cloud," IEEE Network, pp. 78-88 (Mar./Apr. 2015).

"Universal Mobile Telecommunications System (UMTS); LTE; Tsp interface protocol between the MTC Interworking Function (MTC-IWF) and Service Capability Server (SCS) (3GPP TS 29.368 V12.2.0 Release 12)," ETSI TS 129.368 V12.2.0, pp. 1-29 (Oct. 2014).

Mendyk, "NFV + SDN—network in the cloud or cloud in the network?," NFV/IT Transformation, pp. 1-3 (Oct. 7, 2014).

Taleb et al., "Virtualizing the LTE Evolved Packet Core (EPC)," Proc. European Conf. on Networks and Communications (EUCNC), pp. 1-2 (Jun. 2014).

Fajardo et al., "Diameter Base Protocol," RFC 6733, pp. 1-152 (Oct. 2012).

"Digital cellular telecommunications system (Phase 2+); Universal Mobile Telecommunications System (UMTS); LTE; Service requirements for Machine-Type Communications (MTC); Stage 1 (3GPP TS 22.368 V11.6.0 Release 11)," ETSI TS 122 368 V11.6.0, pp. 1-20 (Sep. 2012).

Commonly-assigned, co-pending U.S. Appl. No. 15/679,124 for "Methods, Systems, and Computer Readable Media for Optimizing Machine Type Communication (MTC) Device Signaling," (Unpublished, filed Aug. 16, 2017).

Non-Final Office Action for U.S. Appl. No. 15/679,124 (dated Oct. 4, 2018).

Non-Final Office Action for U.S. Appl. No. 15/604,132 (dated Oct. 2, 2018).

Non-Final Office Action for U.S. Appl. No. 15/499,847 (dated Oct. 2, 2018).

(56) References Cited

OTHER PUBLICATIONS

Commonly-assigned, co-pending U.S. Appl. No. 16/121,203 for "Methods, Systems and Computer Readable Media for Overload and Flow Control at a Service Capability Exposure Function (SCEF)," (Unpublished, filed Sep. 4, 2018).
Commonly-assigned, co-pending International Patent Application Serial No. PCT/US18/41911 for "Methods, Systems, and Computer Readable Media for Dynamically Provisioning Session Timeout Information in a Communications Network," (Unpublished, filed Jul. 12, 2018).
"3rd Generation Partnership Project; Technical Specification Group Services and System Aspects; Architecture enhancements to facilitate communications with packet data networks and applications (Release 15)," 3GPP TS 23.682, V15.5.0, pp. 1-125 (Jun. 2018).
Commonly-assigned, co-pending U.S. Appl. No. 15/990,196 for "Methods, Systems, and Computer Readable Media for Detecting and Mitigating Effects of Abnormal Behavior of a Machine Type Communication (MTC) Device," (Unpublished, filed May 25, 2018).
"3rd Generation Partnership Project; Technical Specification Group Services and System Aspects; Architecture enhancements to facilitate communications with packet data networks and applications (Release 15)," 3GPP TS 23.682, V15.4.0, pp. 1-122 (Mar. 2018).
"3rd Generation Partnership Project; Technical Specification Group Services and System Aspects; General Packet Radio Service (GPRS) enhancements for Evolved Universal Terrestrial Radio Access Network (E-UTRAN) access (Release 15)," 3GPP TS 23.401, V15.3.0, pp. 1-405 (Mar. 2018).

"LTE; Evolved Universal Terrestrial Radio Access Network (E-UTRAN); S1 Application Protocol (S1AP) (3GPP TS 36.413 version 14.2.0 Release 14)," ETSI TS 136 413, V14.2.0, pp. 1-349 (Apr. 2017).
Donovan, "Diameter Routing Message Priority," RFC 7944, pp. 1-18 (Aug. 2016).
Notification of Transmittal of the International Search Report and the Written Opinion of the International Searching Authority, or the Declaration for International Application No. PCT/US2018/016044 (dated Apr. 24, 2018).
Notification of Transmittal of the International Search Report and the Written Opinion of the International Searching Authority, or the Declaration for International Application No. PCT/US2018/016047 (dated Apr. 24, 2018).
Notification of Transmittal of the International Search Report and the Written Opinion of the International Searching Authority, or the Declaration for International Application No. PCT/US2018/016045 (dated Apr. 24, 2018).
"Change Request," InterDigital, Meeting ARC#25, Doc# ARC-2016-0439-TS-0026_sec5_sec6.1, pp. 1-16 (Oct. 17, 2016).
"Routing Non-IP Data to/from Multiple UE Applicatons and Multiple SCS/AS'S," Convida Wireless, 3FPP TSG-SA WG2 #113AH, pp. 1-6 (Feb. 2016).
Notification of Transmittal of the International Search Report and the Written Opinion of the International Searching Authority, or the Declaration for International Application Serial No. PCT/US2018/041911 (dated Oct. 12, 2018)

\* cited by examiner

| User/SCS pair ID | AUTHENTICATION VALIDATED TIME (IN SECONDS) |
|---|---|
| username1@realm/SCS1 | 500 |
| 460001357924671/SCS1 | 60 |
| 664764646538/SCS2 | 30 |
| 8803478952563/SCS3 | 0 |

FIG. 2

| External ID and/or MSISDN | IMSI | Serving Nodes |
|---|---|---|
| username1@realm | 310150123456776 | A, B, C |
| 8678656755555, username2@realm | 460001357924671 | C, D |
| username3@realm2 | 520031234567867 | A, E, F, G |
| 8803478952563 | 470010171566423 | H |

METHODS, SYSTEMS, AND COMPUTER READABLE MEDIA FOR USING AUTHENTICATION VALIDATION TIME PERIODS

TECHNICAL FIELD

The subject matter described herein relates to processing communications. More particularly, the subject matter described herein relates to methods, systems, and computer readable media for using authentication validated time periods.

BACKGROUND

At present, the telecommunications industry anticipates that millions of machine type communications (MTC) devices catering to variety of use cases that will impose a significant burden on telecommunication networks in the near future. This influx of MTC devices introduces a huge opportunity and unseen challenges for telecommunications industry. Current narrowband Internet of Things (NB-IoT) enhancements in LTE networks permit MTC servers to use existing LTE procedures and infrastructure to facilitate communications involving MTC devices. Notably, existing connectivity with an MTC device still relies on long term evolution (LTE) and 3rd Generation Partnership Project (3GPP) based procedures, which may not necessarily be needed for devices that frequently send and receive small amount amounts of data to an application server (AS).

Communications to MTC devices can significantly impact LTE networks. For example, LTE network nodes may be configured to authenticate device trigger requests or other messages that are directed to an MTC device (e.g., a smart electricity meter, a smart refrigerator, a smart lamp, a smart water meter, etc.). Such message authentication may be performed by one or more core network nodes known as home subscriber servers (HSSs). As the number of MTC devices that use an LTE network increases, the amount of signaling traffic for authentication associated with MTC devices will increase, thereby increasing traffic load on the network, and the HSSs in particular. While additional resources can be added to the HSSs to accommodate the increasing load, such solutions can be expensive and require significant time to implement.

SUMMARY

The subject matter described herein relates to methods, systems, and computer readable media for using authentication validated time periods. In some embodiments, a method includes receiving a first message associated with a first MTC device; sending an authentication request associated with the first machine type communications (MTC) device to a home subscriber server (HSS), wherein the authentication request requests a validated time period indicating an amount of time that authentication associated with the first MTC device is valid; and receiving, from the HSS, an authentication response, wherein the authentication response indicates the validated time period.

In some embodiments, a system includes a gateway device comprising at least one processor, the gateway device configured for receiving a first message associated with a first MTC device; sending an authentication request associated with the first MTC device to an HSS, wherein the authentication request requests a validated time period indicating an amount of time that authentication associated with the first MTC device is valid; and receiving, from the HSS, an authentication response, wherein the authentication response indicates the validated time period.

The subject matter described herein can be implemented in software in combination with hardware and/or firmware. For example, the subject matter described herein can be implemented in software executed by at least one processor. In one example implementation, the subject matter described herein may be implemented using a non-transitory computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term 'node' refers to at least one physical computing platform including one or more processors and memory.

As used herein, the terms 'engine' or 'function' can refer to software in combination with hardware and/or firmware for implementing features described herein.

BRIEF DESCRIPTION OF THE DRAWINGS

The subject matter described herein will now be explained with reference to the accompanying drawings of which:

FIG. 2 is diagram illustrating example home subscriber server (HSS) information;

FIG. 3 is a diagram illustrating example mapping information;

DETAILED DESCRIPTION

Figure 1:
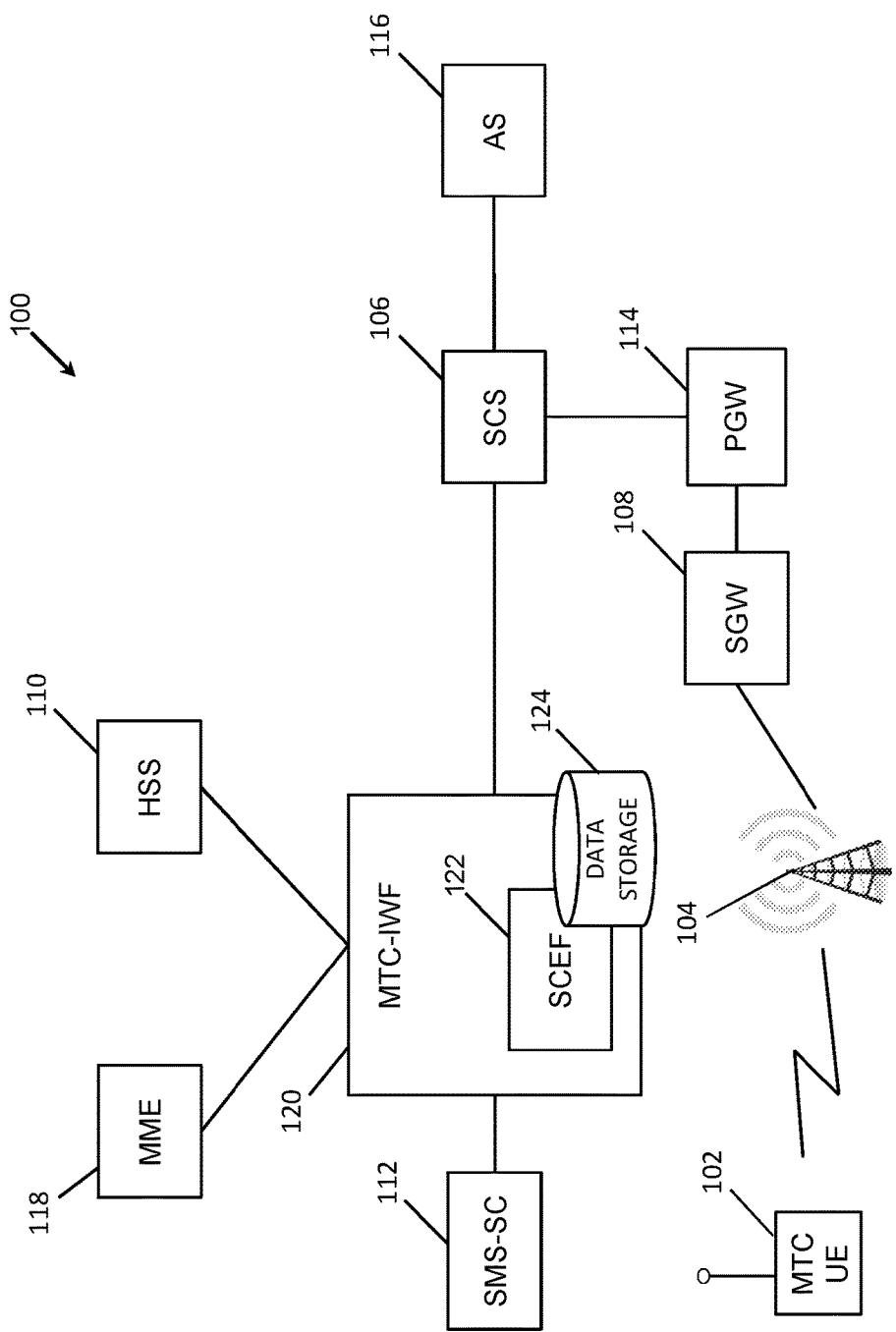
FIG. 1 is a block diagram illustrating an example system configured for using an authentication validated time period.

The subject matter described herein relates to methods, systems, and computer readable media for using authentication validated time periods. LTE network deployments can be used by many subscribers for connecting to and over wireless networks. Prevalent use of LTE networks is enabling the telecommunications industry to continue the expansion into the Internet of Things (IoT) space and to support machine type communications (MTC) use cases. MTC device characteristics are different to the characteristics exhibited by traditional mobile devices. Notably, MTC user equipment (UE) devices can be characterized as instruction-driven with very little human interaction. Additionally, UE devices can be characterized into different categories based on industry and use case. For example, MTC devices that enable smart lighting are classified as stationary, whereas fleet management devices are classified for their mobility based on their frequent change locations. Examples of a UE device includes, but is not limited to a wireless smart electricity meter, a wireless smart water meter, an Internet of things (IoT) device, a machine-to-machine (M2M) device, or any other like device.

Various MTC related interactions involving the LTE infrastructure are described in various 3rd Generation Partnership Project (3GPP) technical specifications. Some relevant 3GPP technical specifications include 3GPP TS 22.368 version 11.6.0 Release 11, 3GPP TS 23.682 version 13.4.0 Release 13, 3GPP TS 23.272 version 14.0.0 Release 14, 3GPP TS 29.337 version 14.2.0 Release 14, and 3GPP TS 29.336 version 14.1.0 Release 14; the disclosures of which are incorporated herein by reference in their entireties. For example, as described in one of the above listed 3GPP technical standards, an S6m interface may be used for communications between a Home Subscriber Server (HSS) and an MTC interworking function (MTC-IWF) and an S6t interface may be used for communications between an HSS and a service capability exposure function (SCEF). In this example, an MTC-IWF can be used to trigger a device whereas a SCEF can handle non-Internet protocol data delivery (NIDD). SCEF can also provide support for registering monitoring events with various network nodes, e.g., an HSS, a mobility management entity (MME), and/or a serving general packet radio service (GPRS) support node (SGSN).

Existing LTE networks may still be characterized as have some of the following shortcomings in the context of MTC data communications. Namely, data connectivity for MTC devices requires the same detailed LTE procedures employed by conventional packet data communications devices despite the fact that only a very small amount of MTC data is communicated between a UE device and an MTC application server. Further, an HSS may be required to perform an authentication procedure for each communication, e.g., a device trigger request from a service capability server (SCS), directed to a UE device.

These procedures can generate a large amount of signaling traffic that can significantly impact the LTE network. Such procedures can also require a lengthy setup time considering the small amount of MTC data and associated transaction time. Further, since an operator network may handle a large and growing number of MTC devices (e.g., IoT devices), authentication procedures related to these MTC device can create or exacerbate issues with high traffic load on HSSs. One possible solution to alleviate the high traffic load may involve adding more servers (e.g., processors) to an HSS group and/or increasing the load capacity of each server in the HSS group. However, such a solution can be expensive and require significant time to implement.

In accordance with some aspects of the subject matter described herein, techniques, methods, systems, or mechanisms are disclosed for utilizing authentication validated time periods. In some examples, an authentication validated time period may represent an amount of time that HSS authentication associated with a UE device and/or a related SCS is valid. For example, during a validated time period, an MTC-IWF and/or an SCEF can bypass HSS authentication for requests (e.g., device trigger requests) associated with a particular user and/or from a particular SCS. In some examples, an authentication validated time period may represent an amount of time that an HSS will monitor communications associated with a UE device and/or a related SCS.

In accordance with some aspects of the subject matter described herein, techniques, methods, systems, or mechanisms are disclosed for request and/or providing authentication validated time periods. In some examples, an attribute value pair (AVP) or other data information element (IE) may include a "timer validity" value or other value for requesting or providing an authentication validated time period or an amount of time thereof. In some examples, an AVP for requesting or providing an authentication validated time period may be associated with vendor-specific AVP code and/or may be of an Unsigned32 type Advantageously, in accordance with some aspects of the subject matter described herein, by utilizing authentication validated time periods and/or related mechanisms for obtaining authentication validated time periods, an MTC-IWF and an HSS can significantly reduce their traffic load related to authentication related traffic since authentication validated time periods reduces authentication signaling related to HSS authentication for messages destined for UE devices, e.g., smart meters and/or stationary devices.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a block diagram illustrating an example communications environment 100 that includes one or more nodes associated with a fourth generation (4G) network, a long term evolution (LTE) network, an Internet protocol (IP) Multimedia Core Network Subsystem (IMS) network, a LTE-advanced network, and/or an EPC network. For example, FIG. 1 includes a UE device 102, such as a wireless smart electricity meter, a wireless smart water meter, an Internet of things (IoT) device, a machine-to-machine (M2M) device, or any other like device that is capable of wirelessly communicating with an eNodeB 104 via 4G, LTE, or some other wireless access protocol. In some embodiments, UE device 102 may be configured to wirelessly connect with eNodeB 104 via a wireless radio control link connection (e.g., a RRC connection) in order to facilitate communication with an MTC application server or MTC application function accessible via an external network (e.g., the Internet). UE device 102 may be configured to generate MTC data (e.g., water meter data, electrical meter data, etc.) on a period basis or on demand (e.g., in response to a device trigger message from MTC application server 116). In some embodiments, previous generation of MTC data at UE device 102 may imply that at least one device trigger message has been received in the past.

Communications environment 100 may also include various network elements, such as evolved packet system (EPS) network nodes and/or other nodes. For example, communications environment 100 may include a mobility management entity (MME) 118, a serving gateway (SGW) 108, a home subscriber server (HSS) 110, a packet data network gateway (PGW) 114, a short message service-service center (SMS-SC) 112, and an MTC application server 116. In some embodiments, communications environment 100 and/or its related nodes may be configured to handle and facilitate traditional multimedia services (e.g., Internet access, (voice over IP) VoIP call sessions, voice over LTE (VoLTE) call sessions, M2M sessions, MTC data transfer sessions, etc.) via established IP based data sessions requested by an MTC user equipment device.

HSS 110 may represent any suitable entity or entities (e.g., software executing on at least one processor) for performing one or more aspects associated with storing, accessing, or using subscriber related information. For example, HSS 110 may include subscriber related information, such as user identification, control information for user authentication and authorization, location information, and user profile data.

In some embodiments, HSS 110 may receive subscriber information requests (SIRs) or other messages for requesting whether a subscriber or UE device is authorized for various communications or interactions. For example, HSS 110 may determine, using subscriber related data, whether a device trigger request is authorized for transmission or processing. In this example, if authorization is granted, HSS 110 may indicate authorization is granted to a routing or gateway node responsible for transmitting the device trigger request. However, in this example, if authorization is not granted, HSS 110 may indicate authorization is not granted to the routing or gateway node and the routing or gateway node may discard the device trigger request.

Communications environment 100 may also include an MTC-IWF 120, a SCEF 122, a data storage 124, and a SCS 106. MTC-IWF 120 may represent any suitable entity or entities (e.g., software executing on at least one processor) for performing one or more aspects associated with facilitating communications between MTC related nodes and LTE networks. For example, MTC-IWF 120 may include various interworking functions that allow MTC related communications to traverse an LTE network. Some example functions performable by MTC-IWF 120 may include termination of various reference points or communications interfaces associated MTC related communications, authorization of control plane requests from SCS 106, and HSS interrogation, among other things. For example, MTC-IWF 120 may receive a device trigger request from SCS 106 and may request authorization from HSS 110 regarding the request. In this example, MTC-IWF 120 may receive and indicate the authentication response to SCS 106 and, if appropriate, MTC-IWF 120 may select and provide an appropriate device trigger delivery mechanism for the request.

SCEF 122 may represent any suitable entity or entities (e.g., software executing on at least one processor) for performing one or more aspects associated with exposing services and/or capabilities. For example, SCEF 122 may expose the services and capabilities provided by 3GPP network interfaces. In another example, SCEF 122 may also provide support for registering monitoring events with various network nodes.

In some embodiments, MTC-IWF 120 and SCEF 122 may be co-located. For example, MTC-IWF 120 and SCEF 122 may be implemented on a same computing platform or device.

In some embodiments, MTC-IWF 120 and SCEF 122 may be distinct and separate entities. For example, MTC-IWF 120 and SCEF 122 may be implemented on separate computing platforms.

In some embodiments, a Diameter signaling router or a Diameter routing agent may include MTC-IWF 120 and/or SCEF 122 or similar functionality. For example, a Diameter signaling router may be any suitable entity or entities for routing, forwarding, relaying Diameter or other messages to network nodes in communications environment 100. In this example, the Diameter signaling router may interact with SCS 106 and HSS 110 via various MTC related interfaces, such as S6m, S6t, Tsp, etc.

In some embodiments, MTC-IWF 120 and SCEF 122 may include or access data storage 124. Data storage 124 may represent any suitable entity or entities (e.g., non-transitory computer readable media, flash memory, random access memory, and/or a storage device) for storing information related to MTC communications and MTC related devices. For example, data storage 124 may store session data for various UE devices and/or related nodes, e.g., a list of relevant serving nodes for communicating with a UE device 102 and mappings of external UE identifiers and/or internal UE identifiers.

SCS 106 may represent any suitable entity or entities (e.g., software executing on at least one processor) for performing one or more aspects associated with providing access to services. For example, SCS 106 may include functionality for providing access to one or more service components over standardized communications interfaces (e.g., application programming interfaces). In some embodiments, SCS 106 may also host one or more service components. SCS 106 may also send communications, e.g., device trigger requests, destined for UE device 102 for triggering various actions.

MTC data communications between a UE device and an MTC application server may be established and handled like any other client and server communications over the EPC. For example, dedicated session bearers may be established using SGW 108 and PGW 114. In addition, MTC-IWF 120 and/or SCEF 122 and SCS 106 may also be utilized to establish a bearer connection between UE device 102 and MTC application server 116.

MTC application server 116 may be any computing device that hosts an MTC service and communicates with a plurality of UE devices (e.g., UE device 102). In some embodiments, MTC application server 116 may be configured to send a device trigger message (e.g., a device wakeup message) to UE device 102 via data tunnels traversing MTC-IWF 120, SCEF 122, and/or SCS 106. Notably, the device trigger message may include an MTC identity that identifies UE device 102. In some embodiments, the MTC identity is an identifier that a service operator assigns to a UE device and is provided to MTC application server 116. An MTC identity may remain assigned to a given UE device throughout its subscription validation for the network. Further, an MTC identity notably may refer to the subscribed identity for UE device 102. MTC-IWF 120, SCEF 122, and/or SCS 106 may include one or more mapping tables that include entries that map MTC identities/identifiers to MTC paging identifiers (e.g., temporary UE identifiers). In some embodiments, MTC-IWF 120 or a related entity (e.g., SCEF 122) may forward the device trigger message to UE device 102 using an MTC paging identifier that corresponds to an MTC identity.

In some embodiments, a device trigger message may includes address information for MTC application server 116 and may act as a request for UE device 102 to generate or collect MTC data and to subsequently send the generated and/or collected MTC data to MTC application server 116 via MTC-IWF 120 or another entity. In some embodiments, UE device 102 may be previously provisioned with the address of MTC application server 116.

In some embodiments, MTC application server 116 may utilize device trigger messages to direct UE device 102 to execute UE firmware or software upgrades. In such an event, caching of this paging request (i.e., device trigger message) may occur at SMS-SC 112, eNodeB 104 or another network node until UE device 102 awakens and established a radio link with eNodeB 104. Further, this device trigger message is a logical extension for supporting device upgrades (or an information to UE device 102 that MTC applications server 116 attempted to communicate some specific data to UE device 102).

In some embodiments, device trigger requests and/or other messages may be sent from MTC application server 116 to MTC-IWF 120 and/or SCEF 122 via SCS 106. In some embodiments, MTC-IWF 120 and/or SCEF 122 may be configured to authenticate a device trigger request with HSS 110. For example, using an S6 interface, MTC-IWF 120 and/or SCEF 122 may send an authentication request, e.g., SIR, for authenticating a particular user and/or from a particular SCS (e.g., a user/SCS pair), to HSS 110. In such embodiments, HSS 110 may receive and authenticate the request and, if authenticated, HSS 110 may send a list of serving nodes and related IMSIs through which SMS-SC 112 can deliver a device trigger request to UE device 102.

In some embodiments, HSS 110 may include functionality for reducing the number of authentication requests generated by MTC-IWF 120 and/or SCEF 122. For example, HSS 110 may support authentication validated time periods for various user/SCS pairs such that HSS authentication for requests associated with the various user/SCS pairs can be bypassed during the validated time periods.

In some embodiments, HSS 110 may include functionality for controlling, granting, and/or revoking validated time periods. For example, HSS 110 may grant validated time periods to some user/SCS pairs based on configuration or policy rules at HSS 110, while not granting validated time periods to other user/SCS pairs, e.g., if rules are not met. In another example, if there is a change in mapping information and/or a change in authentication rules, HSS 110 may send a reporting information request (RIR) or another message (e.g., an updated SIR if supported) to MTC-IWF 120 or SCEF 122 for modifying or terminating a validated time period.

In some embodiments, HSS 110 and/or other entities (e.g., SCS 106, MTC-IWF 120, and/or SCEF 122) may utilize AVPs (e.g., Diameter AVPs) or other IEs to indicate optional features supported by a node. For example, HSS 110, MTC-IWF 120, and/or another entity (e.g., SCEF 122) may use a 'supported-features' AVP for indicating that validated time periods or related mechanisms are supported. In another example, when sending an authentication request (e.g., a SIR) to HSS 110, MTC-IWF 120 may use a 'supported-features' AVP for indicating support for a vendor specific feature, e.g., an 'updated SIR from HSS' feature (e.g., Feature-List-ID=1). In this example, the 'updated SIR from HSS' feature may indicate that MTC-IWF 120 can receive an updated SIR from HSS 110.

In some embodiments, HSS 110 and/or other entities (e.g., SCS 106, MTC-IWF 120, and/or SCEF 122) may utilize AVPs (e.g., Diameter AVPs) or other IEs to request and/or provide validated time periods. For example, an example AVP, referred to herein as an "authentication validity timer" AVP, for requesting or providing validated time periods may include a "validity timer" value. In some examples, a "validity timer" value may indicate an amount of time (e.g., a maximum amount of seconds, minutes, hours, days, etc.) for the validated time period. In some example, an "authentication validity timer" AVP or IE may be provided in various types of messages and/or using various different protocols and/or data formats, e.g., Diameter, hypertext transfer protocol (HTTP), extensible markup language (XML), etc.

In some embodiments, an "authentication validity timer" AVP may define a value for indicating an amount of time for which (re-)authentication by HSS 110 is not needed for a given user/SCS pair. For example, HSS 110 may indicate that re-authentication is not needed for a given user/SCS pair for the next 90 seconds by sending, to MTC-IWF 120 and/or SCEF 122, an authentication response containing an "authentication validity timer" AVP with a "validity timer" value set to 0.

In some embodiments, an amount of time to perform monitoring by HSS 110 and an amount of time to bypass HSS authentication may be the same. For example, HSS 110 may be configured to monitor various events for suspicious activity throughout a validated time period and, if a suspicious activity is detected, HSS 110 may terminate the validated time period, e.g., by sending an RIR containing an "authentication validity timer" AVP with a "validity timer" value set to 0.

In some embodiments, an amount of time to perform monitoring by HSS 110 and an amount of time bypass HSS authentication may be different. For example, HSS 110 may be configured to monitor events for suspicious activity for a fixed amount of time and a validated time period may be more or less than that fixed amount of time.

In some embodiments, if HSS 110 supports validated time periods and/or related mechanisms (e.g., "authentication validity timer" AVPs), HSS 110 may authenticate an authentication request based on various authentication rules and logic, e.g., operator/network agreements, user preferences, and/or subscriber tiers and may determine whether to grant or modify a validated time period. In some embodiments, if an authentication response to be returned is successful, HSS 110 may include at least one "authentication validity timer" AVP. For example, an "authentication validity timer" AVP may indicate a validated time period for which re-authentication is not needed for a given user/SCS pair and/or may indicate an amount of time that HSS 110 will monitor communications associated with a given user/SCS pair.

In some embodiments, if HSS 110 does not support validated time periods and/or related mechanisms (e.g., "authentication validity timer" AVPs), HSS 110 may ignore an "authentication validity timer" AVP in an authentication request and may authenticate the request based on various authentication rules and logic.

In some embodiments, if an authentication response lacks an "authentication validity timer" AVP or if a "validity timer" value in an "authentication validity timer" AVP is set to 0, SCS 106 or a related node, e.g., MTC-IWF 120, may authenticate every device action request with HSS 110.

It will be appreciated that FIG. 1 and its related description are for illustrative purposes and that each of nodes and entities described above may include additional and/or different modules, components, or functionality. Further, MTC-IWF 120, SCEF 122, SCS 106, and/or related functionality described herein may be associated with different and/or additional nodes or entities.

FIG. 2 is a diagram illustrating example HSS information. In FIG. 2, data structure 200 is depicted. Data structure 200 may represent one or more data structures for storing information related to authenticated validated time periods. Each row represents an association between a user/SCS pair identifier and a corresponding validated time period. As depicted in FIG. 2, a user/SCS pair identifier may represent a unique pairing of a user or UE device and a related SCS (e.g., UE device 102 and SCS 106). In some examples, a user/SCS pair identifier may represent messages or communications that traverse a particular SCS are directed to or associated with a particular user or UE device. In some embodiments, a user/SCS pair identifier may be based on or derived from a UE device identifier (e.g., an MSISDN or an external id) and a SCS identifier (e.g., SCS identity).

In some embodiments, each validated time period may represent an amount of time that HSS 110 has granted for given user/SCS pair identifier. In some examples, a validated time period may indicate an amount of time for which (re-)authentication is not needed for a given user/SCS pair and/or may indicate an amount of time that HSS 110 will monitor communications associated with a given user/SCS pair. In some embodiments, if a validated time period is set to 0, SCS 106 or a related node, e.g., MTC-IWF 120, may (re-)authenticate every device action request with HSS 110.

In some embodiments, data structure 200 may include event and/or monitoring directives. For example, HSS 110 may be configured to monitor certain events during a validated time period. In some examples, user/SCS pairs may be associated with the same monitoring directives (e.g., mobility management monitoring, attachment/detachment monitoring, etc.) In some example, some user/SCS pairs may be associated with different monitoring directives.

It will be appreciated that data depicted in FIG. 2 is illustrative and that different and/or additional data may be used for utilizing authentication validated time periods.

FIG. 3 is a diagram illustrating example mapping information. In FIG. 3, data structure 300 is depicted. Data structure 300 may represent one or more data structures for storing information related to serving nodes associated with UE identifiers. In some embodiments, data structure 300 or related data may be accessible to MTC-IWF 120 or SCEF 122. For example, data structure 300 or related data may be stored in data storage 124. In some embodiments, data structure 300 or related data may be obtained or derived from information provided by various nodes, e.g., UE device 102, SCS 106, HSS 110, and/or MME 118.

In some embodiments, each row represents an association between an external identifier (e.g., 'usemame1@realm') and/or an MSISDN (e.g., '867865675555') associated with a UE device and an internal identifier (e.g., an IMSI, such as '470010171566423') associated with a UE device. In some embodiments, UE identifiers may be received from SCS 106, e.g., in device trigger requests or other messages and/or UE identifiers may be received from other nodes.

In some embodiments, each row may indicate one or more serving nodes for a related UE device. For example, data structure 300 may store a number of identifiers serving nodes (e.g., SMS-SC 112 or other network nodes) for communicating with a UE device. In some embodiments, serving nodes or related identifiers may be received from SCS 106, e.g., in device trigger requests or other messages and/or UE identifiers may be received from other nodes.

In some embodiments, an external identifier and/or an MSISDN may represent a UE identifier for indicating a UE device. In some examples, an external identifier and/or an MSISDN may be used as an identifier for various network nodes or other entities to communicate with or about a UE device (e.g., UE device 102). In some embodiments, an external identifier and/or an MSISDN may be provided by a UE device or a related node (e.g., SCS 106).

In some embodiments, an internal identifier may represent a UE identifier for indicating a UE device. In some examples, an internal identifier may be an IMSI and may be used as a charging identifier. In some embodiments, an external identifier may be preferred over an internal identifier, especially when involving nodes outside of a home network. In some embodiments, an internal identifier may be provided by a UE device or a network node (e.g., HSS 110).

It will be appreciated that data depicted in FIG. 3 is illustrative and that different and/or additional data may be used for utilizing authentication validated time periods.

Figure 4:
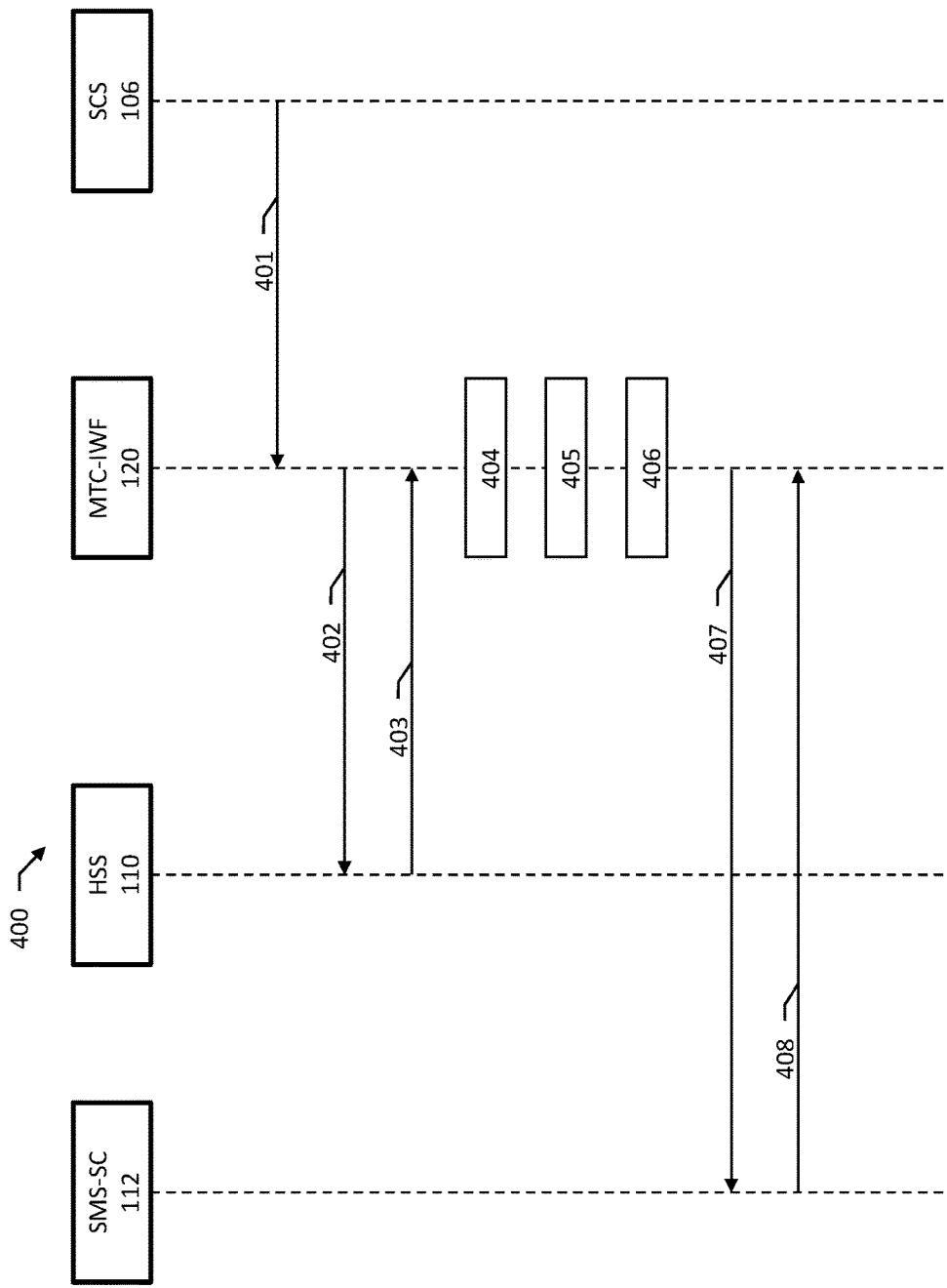
FIG. 4 is a message flow diagram illustrating a message sequence related to requesting an authentication validated time period.

FIG. 4 is a message flow diagram illustrating a message sequence 400 related to utilizing an authentication validated time period. In some examples, message sequence 400 may occur for authenticating a particular UE device and a related SCS. In some embodiments, message sequence 400 may occur in communications environment 100 where HSS 110 supports validated time periods and/or related mechanisms (e.g., "authentication validity timer" AVPs).

Referring to FIG. 4, in step 401, a request message may be sent from SCS 106 to MTC-IWF 120 or a related entity (e.g., SCEF 122). For example, a device action request may be sent, via a Tsp interface or another communications interface, from SCS 106 to MTC-IWF 120 for triggering UE device 102 to perform one or more actions, e.g., send a data report or update its firmware or software.

In step 402, an authentication request may be sent from MTC-IWF 120 or a related entity to HSS 110. For example, MTC-IWF 120 or a related entity (e.g., SCEF 122) may authenticate a SCS/User identifier pair with HSS 110 by sending a subscriber information request (SIR). In some examples, an authentication request, e.g., SIR, may include a "validity timer" value (e.g., five hundred seconds) in an AVP, referred to herein as an "authentication validity timer" AVP for requesting an amount of time for a validated time period.

In some embodiments, an "authentication validity timer" AVP may be of an Unsigned32 type and/or may be optional and vendor specific. In some examples, an "authentication validity timer" AVP may request a maximum time that SCEF 122 or MTC-IWF 120 can avoid authorizing with HSS 110 for messages associated with a particular user and SCS 106.

In step 403, an authentication response may be sent from HSS 110 to MTC-IWF 120 or a related entity. For example, after receiving an authentication request, HSS 110 may authenticate a user/SCS pair indicated by the authentication request and respond with an authentication response, e.g., a subscriber information answer (SIA). In some examples, an authentication response may contain addressing information, e.g., a list of serving nodes and related identifiers (e.g., IMSIs) associated with a destination (e.g., SMS-SC 112 or a network node). In some examples, a destination indicated in an authentication response may be a node capable of delivering a device trigger request or other message to UE device 102. In some examples, the authentication response may include a 'validity timer' value (e.g., 60 seconds) for indicating an amount of time for a granted validated time period.

In some embodiments, a granted validated time period may be determined by HSS 110 and/or based on various factors. In such embodiments, the amount of time for the granted validated time period may be more, less, or the same amount of time requested in the authentication request.

In some embodiments, if HSS 110 supports validated time periods and/or related mechanisms, HSS 110 may monitor UE device 102 during a validated time period. For example, HSS 110 may monitor UE device 102 and, if HSS 110 detects any configuration and/or policy changes associated with UE device 102 or a change in status of UE device 102, HSS 110 may send a message (e.g., an RIR or an updated SIR) to MTC-IWF 120 or SCEF 122 for modifying or terminating a validated time period.

In some embodiments, e.g., when a validated time period is not granted by HSS 110, MTC-IWF 120 or a related entity (e.g., SCEF 122) may send an authentication request message to HSS 110 for authentication and authorization of each device trigger request.

In some embodiments, e.g., when a validated time period is granted by HSS 110, MTC-IWF 120 or a related entity (e.g., SCEF 122) may not be required to re-authorize with HSS 110 when messages (e.g., from SCS 106) are received for a same user and SCS pair during the validated time period.

In some embodiments, an authentication response, e.g., a SIA, may include an AVP, referred to herein as an "authentication validity timer" AVP, for indicating a validated time period. For example, an "authentication validity timer" AVP may indicate a maximum time SCEF 122 or MTC-IWF 120 can avoid authorizing with HSS 110 for messages associated with a particular user and SCS 106.

In step 404, MTC-IWF 120 or a related entity may create or update a session context and store related information, e.g., at data storage 124. For example, if an "authentication validity timer" AVP is provided by HSS 110 in a SIA, then MTC-IWF 120 and/or SCEF 122 may store or update a list of relevant serving nodes and may store or update mappings of external ids and/or MSISDNs to IMSIs.

In step 405, MTC-IWF 120 or a related entity may determine, using routing data and/or related rules (e.g., in a peer routing table) may identify SMS-SC 112 as a destination for service node information associated with the request message.

In step 406, MTC-IWF 120 or a related entity may generate a trigger message for sending the service node information to SMS-SC 112. For example, MTC-IWF 120 or a related entity may generate a device trigger request to SMS-SC 112.

In step 407, MTC-IWF 120 or a related entity may send the trigger message to SMS-SC 112 for delivery to UE device 102. In some embodiments, the trigger message may be for triggering UE device 102 to perform one or more actions.

In step 408, SMS-SC 112 may generate and send a trigger response message to MTC-IWF 120 or a related entity. For example, SMS-SC 112 may generate and send a device trigger answer to MTC-IWF 120 or a related entity. In this example, the device trigger answer may indicate whether UE device 102 received the message and/or performed the requested action(s).

In some embodiments, MTC-IWF 120 or a related entity may clear or delete a validated time period associated with UE device 102 based on one or more responses from SMS-SC 112 or another entity. For example, MTC-IWF 120 may clear a validated time period associated with UE device 102 if SMS-SC 112 sends any of the following error responses: 'DIAMETER_ERROR_USER_UNKNOWN', 'DIAMETER_ERROR_INVALID_SME_ADDRESS' or DIAMETER_ERROR_SC_CONGESTION.

It will be appreciated that message sequence 400 in FIG. 4 is for illustrative purposes and that different and/or additional messages and/or actions may be used for requesting or utilizing validated time periods. It will also be appreciated that various messages and/or actions described herein with regard to message sequence 400 may occur in a different order or sequence.

Figure 5:
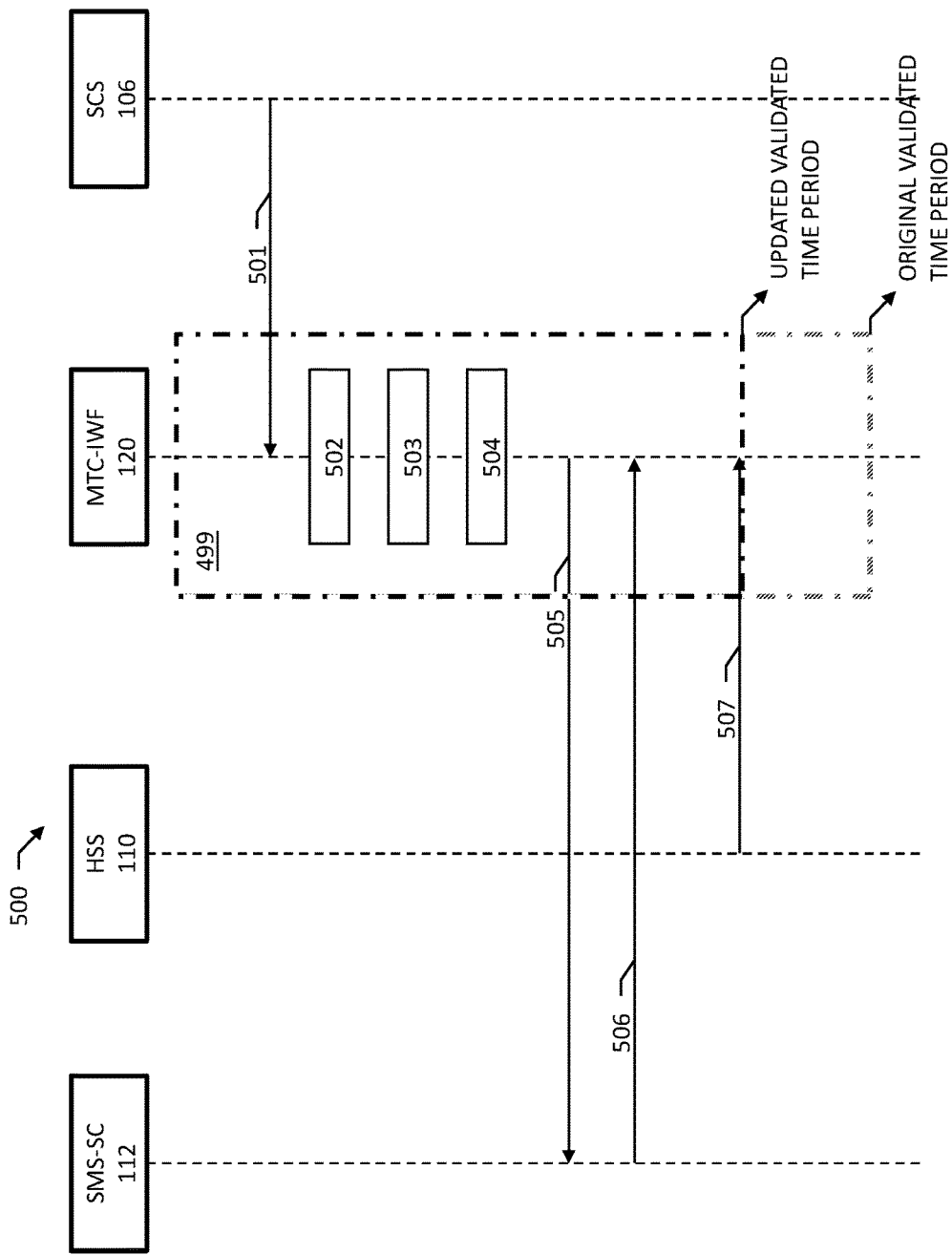
FIG. 5 is a message flow diagram illustrating a message sequence related to utilizing an authentication validated time period.

FIG. 5 is a message flow diagram illustrating a message sequence 500 related to utilizing an authentication validated time period. In some examples, message sequence 500 may occur after a validated time period 499 has been requested and granted. Validated time period 499 may represent an amount of time that HSS authentication associated with a UE device and/or SCS 106 is valid. For example, during a validated time period, MTC-IWF 120 or a related entity (e.g., SCEF 122) can bypass HSS authentication for requests associated with a particular user and/or from a particular SCS, e.g., requests for UE device 102 from SCS 106.

Referring to FIG. 5, in step 501, during authentication validated time period 499, a request message may be sent from SCS 106 to MTC-IWF 120 or a related entity (e.g., SCEF 122). For example, a device action request may be sent from SCS 106 to MTC-IWF 120 for triggering UE device 102 to perform one or more actions, e.g., send a data report or update its firmware or software.

In step 502, in lieu of authenticating the received message using HSS 110 and in response to determining that authentication validated time period is active/valid, MTC-IWF 120 or a related entity may create or update a session context and store related information, e.g., at data storage 124.

In step 503, MTC-IWF 120 or a related entity may determine, using routing data and/or related rules (e.g., in a peer routing table) may identify SMS-SC 112 as a destination for service node information associated with the request message.

In step 504, MTC-IWF 120 or a related entity may generate a trigger message for sending the service node information to SMS-SC 112. For example, MTC-IWF 120 or a related entity may generate a device trigger request to SMS-SC 112.

In step 505, MTC-IWF 120 or a related entity may send the trigger message to SMS-SC 112 for delivery to UE device 102. In some embodiments, the trigger message may be for triggering UE device 102 to perform one or more actions.

In step 506, SMS-SC 112 may generate and send a trigger response message to MTC-IWF 120 or a related entity. For example, SMS-SC 112 may generate and send a device trigger answer to MTC-IWF 120 or a related entity. In this example, the device trigger answer may indicate whether UE device 102 received the message and/or performed the requested action(s).

In some embodiments, MTC-IWF 120 or a related entity may clear or delete a validated time period associated with UE device 102 based on one or more responses from SMS-SC 112 or another entity. For example, MTC-IWF 120 may clear a validated time period associated with UE device 102 if SMS-SC 112 sends any of the following error responses: 'DIAMETER_ERROR_USER_UNKNOWN', 'DIAMETER_ERROR_INVALID_SME_ADDRESS' or DIAMETER_ERROR_SC_CONGESTION.

In step 507, a validation related message may be sent from HSS 110 to MTC-IWF 120 or a related entity. For example, if there is a change in mapping information and/or authentication rules associated with UE device 102, HSS 110 may send a message to MTC-IWF 120 or SCEF 122 indicating that a validated time period associated with UE device 102 is modified or terminated, e.g., a "validity timer" value in an AVP in the message may be set to 0 or another value.

In some embodiments, e.g., if receiving an updated SIR from HSS 110 is supported by MTC-IWF 120, HSS 120 may send an updated SIR indicating that a validated time period associated with UE device 102 is modified or terminated. In some embodiments, e.g., if receiving an updated SIR from HSS 110 is not supported by MTC-IWF 120, HSS 120 may send an RIR indicating that a validated time period associated with UE device 102 is modified or terminated.

In some embodiments, HSS 110 may adjust or terminate a validated time period for various reasons and/or based on various data. For example, HSS 110 may monitor various events about UE device 102 and/or SCS 106 and/or may receive communications from various network nodes, e.g., MME 118. In this example, if HSS 110 determines that a UE device or a related SCS 106 is associated with suspicious activities (e.g., after receiving information indicating movement or a change in location associated with UE device), HSS 110 may terminate or adjust a validated time period, e.g., by sending an RIR or other message indicating the change or termination.

In some embodiments, after a validated time periods ends (e.g., by a planned expiration or explicit termination), MTC-IWF 120 or a related entity (e.g., SCEF 122) may (re-)authenticate a subsequent request with HSS 110. For example, after a validated time period ends, MTC-IWF 120 may send a SIR to HSS 110 for authenticating a subsequent request and may also request a new validated time period in the SIR.

It will be appreciated that message sequence 500 in FIG. 5 is for illustrative purposes and that different and/or additional messages and/or actions may be used for requesting or utilizing validated time periods. It will also be appreciated that various messages and/or actions described herein with regard to message sequence 500 may occur in a different order or sequence.

Figure 6:
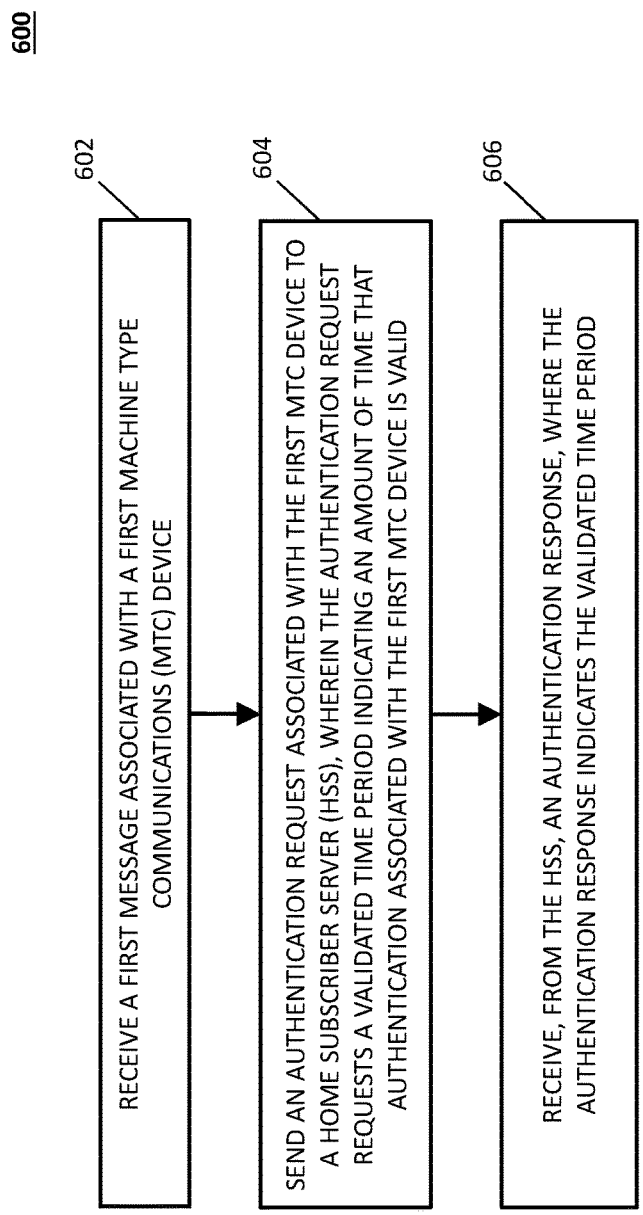
FIG. 6 depicts an example method for using an authentication validated time period.

FIG. 6 depicts an example method 600 for using authentication validated time periods. In some embodiments, example method 600 described herein, or portions thereof, may be performed at or performed by a gateway device (e.g., at least one computing platform comprising one or more processors), a Diameter routing agent, MTC-IWF 120, SCEF 122, and/or another module or node. For example, method 600 may be an algorithm that is stored in memory and executed by at least one processor within one or more of these aforementioned network components. In some embodiments, method 600 may include steps 602, 604, and/or 606.

In step 602, a first message associated with a first MTC device may be received. For example, SCS 106 may send a device action request to MTC-IWF 120 or SCEF 122 for triggering an action at UE device 102 via a network node (e.g., SMS-SC 112). In some embodiments, a first MTC device may be a UE device, a M2M device, or an IoT device.

In step 604, an authentication request associated with the first MTC device may be sent to an HSS, wherein the authentication request may request a validated time period indicating an amount of time that authentication associated with the first MTC device is valid. For example, after receiving a device action request associated with UE device 102 from SCS 106, MTC-IWF 120 or SCEF 122 may generate and send an authentication request (e.g., an SIR) to HSS 110.

In some embodiments, an authentication request may include one or more AVPs (e.g., an "authentication validity timer" AVP) for requesting a validated time period that authentication for UE device 102 and/or SCS 106 is valid. In some embodiments, an authentication request may be an SIR and wherein the authentication response may be an SIA.

In some embodiments, HSS 110 may monitor one or more events associated with an MTC device during the validated time period. For example, an authentication request may indicate a particular user/SCS pair (e.g., UE device 102 and SCS 106) involved in MTC communications. In this example, HSS 110 may store information about the user/SCS pair and may monitor various network communications (e.g., mobility management messages) and related events to determine whether the user/SCS pair is no longer valid or is suspicious. Continuing with this example, if HSS 110 determines the user/SCS pair is no longer valid or is suspicious; HSS 110 may deny authentication for messages associated with the user/SCS pair or may terminate an existing validated time period associated with the user/SCS pair.

In step 606, an authentication response may be received from the HSS, wherein the authentication response may indicate the validated time period, e.g., in one or more data formats. In some embodiments, authentication request information or authentication response information may be stored in one or more AVPs. For example, HSS 110 may receive an authentication request that includes authentication request information (e.g., a request in an AVP for a thirty minute validated time period for communications from UE device 102 and/or SCS 106). In this example, HSS 110 may send an authentication response that includes authentication response information (e.g., a response in an AVP granting a five minute validated time period for communications from UE device 102 and/or SCS 106).

In some embodiments, after receiving an authentication response indicating a validated time period (e.g., of five minutes) for a UE device and/or a related entity (e.g., SCS 106), one or more messages associated with the device may be received and sent during the validated time period without sending a corresponding second authentication request to the HSS. For example, during a five minute validated time period for communications from UE device 102 and/or SCS 106, MTC-IWF 120 or SCEF 122 may receive one or more messages (e.g., one or more device action requests or a device trigger requests). In this example, in lieu of requesting authentication from HSS 110, MTC-IWF 120 or SCEF 122 may treat the messages as authenticated, e.g., by sending them onward to their destination(s), such as SMS-SC 112.

In some embodiments, during a validated time period, a validation related message (e.g., an RIR or an updated SIR) including validation related information for indicating a second validated time period may be received from the HSS. For example, HSS 110 may monitor various aspects of the network and, based on one or more factors, may determine that an existing validation time period for a given device and/or SCS (e.g., UE device 102 and SCS 106) needs to be adjusted or canceled. In this example, in response, HSS 110 may send an RIR or other message to MTC-IWF 120 or a related entity (e.g., SCEF 122) for adjusting or canceling the validation time period for the given device and/or SCS.

In some embodiments, after a validated time period, a second authentication request associated with a first MTC device may be sent to the HSS. For example, after a validated time period, MTC-IWF 120 or a related entity (e.g., SCEF 122) may send an authentication request to HSS 110. In this example, the authentication request may request authentication for a received message from a given device and/or SCS (e.g., UE device 102 and SCS 106) and/or may request a new validated time period for avoiding sending individual authentication requests for messages from the given device and/or SCS during the validated time period.

It should be noted that each of MTC-IWF 120, SCEF 122, and/or functionality described herein may constitute a special purpose computing device. Further, MTC-IWF 120, SCEF 122, HSS 110 and/or functionality described herein can improve the technological field of network communications involving MTC devices (e.g., UE devices, M2M devices, IoT devices, etc.) by utilizing authentication validated time periods, thereby reducing signaling and network load associated with authenticating MTC related communications. For example, the disclosed subject matter affords the technical advantage of providing an authentication validated time period such that messages associated with a particular UE device and/or SCS 106 need not request authentication for each of those messages. In this example, by avoiding and/or reducing authorization procedures associated with a UE device, faster communications and better resource utilization can also occur.

It will be understood that various details of the subject matter described herein may be changed without departing from the scope of the subject matter described herein.

Furthermore, the foregoing description is for the purpose of illustration only, and not for the purpose of limitation.

What is claimed is:

1. A method comprising:
receiving a first message associated with a first machine type communications (MTC) device;
sending an authentication request associated with the first MTC device to a home subscriber server (HSS), wherein the authentication request requests a validated time period indicating an amount of time that authentication associated with the first MTC device is valid;
after the HSS authenticates the first MTC device, receiving, from the HSS, an authentication response, wherein the authentication response indicates the validated time period;
sending the first message;
receiving and sending a second message associated with the first MTC device during the validated time period without sending a corresponding second authentication request to the HSS; and
after the validated time period, sending a second authentication request associated with the first MTC device to the HSS.

2. The method of claim 1 comprising:
during the validated time period, receiving, from the HSS, a validation related message for adjusting or terminating the validated time period.

3. The method of claim 2 wherein the validation related message includes a reporting information request (RIR) or an updated subscriber information request (SIR).

4. The method of claim 1 wherein the first message is a device action request or a device trigger request.

5. The method of claim 1 wherein the authentication request is a subscriber information request (SIR) and wherein the authentication response is a subscriber information answer (SIA).

6. The method of claim 1 wherein the HSS monitors one or more events associated with the first MTC device during the validated time period.

7. The method of claim 1 wherein the first MTC device is a user equipment (UE) device, a machine-to-machine (M2M) device, or an internet of things (IoT) device and wherein the method occurs at a gateway device including a Diameter routing agent, a machine type communications interworking function (MTC-IWF) or a service capability exposure function (SCEF).

8. A system comprising:
a gateway device comprising at least one processor, the gateway device configured for:
receiving a first message associated with a first machine type communications (MTC) device;
sending an authentication request associated with the first MTC device to a home subscriber server (HSS), wherein the authentication request requests a validated time period indicating an amount of time that authentication associated with the first MTC device is valid;
after the HSS authenticates the first MTC device, receiving, from the HSS, an authentication response, wherein the authentication response indicates the validated time period;
sending the first message;
receiving and sending a second message associated with the first MTC device during the validated time period without sending a corresponding second authentication request to the HSS; and
after the validated time period, sending a second authentication request associated with the first MTC device to the HSS.

9. The system of claim 8 wherein the gateway device is configured for: during the validated time period, receiving, from the HSS, a validation related message for adjusting or terminating the validated time period.

10. The system of claim 9 wherein the validation related message includes a reporting information request (RIR) or an updated subscriber information request (SIR).

11. The system of claim 8 wherein the first message is a device action request or a device trigger request.

12. The system of claim 8 wherein the authentication request is a subscriber information request (SIR) and wherein the authentication response is a subscriber information answer (SIA).

13. The system of claim 8 wherein the HSS monitors one or more events associated with the first MTC device during the validated time period.

14. The system of claim 8 wherein the first MTC device is a user equipment (UE) device, a machine-to-machine (M2M) device, or an internet of things (IoT) device.

15. The system of claim 8 wherein the gateway device includes a Diameter routing agent, a machine type communications interworking function (MTC-IWF) or a service capability exposure function (SCEF).

16. A non-transitory computer readable medium comprising computer executable instructions embodied in the non-transitory computer readable medium that when executed by at least one processor of at least one computer cause the at least one computer to perform steps comprising:
receiving a first message associated with a first machine type communications (MTC) device;
sending an authentication request associated with the first MTC device to a home subscriber server (HSS), wherein the authentication request requests a validated time period indicating an amount of time that authentication associated with the first MTC device is valid;
after the HSS authenticates the first MTC device, receiving, from the HSS, an authentication response, wherein the authentication response indicates the validated time period;
sending the first message;
receiving and sending a second message associated with the first MTC device during the validated time period without sending a corresponding second authentication request to the HSS; and
after the validated time period, sending a second authentication request associated with the first MTC device to the HSS.

* * * * *